Patented Apr. 2, 1935

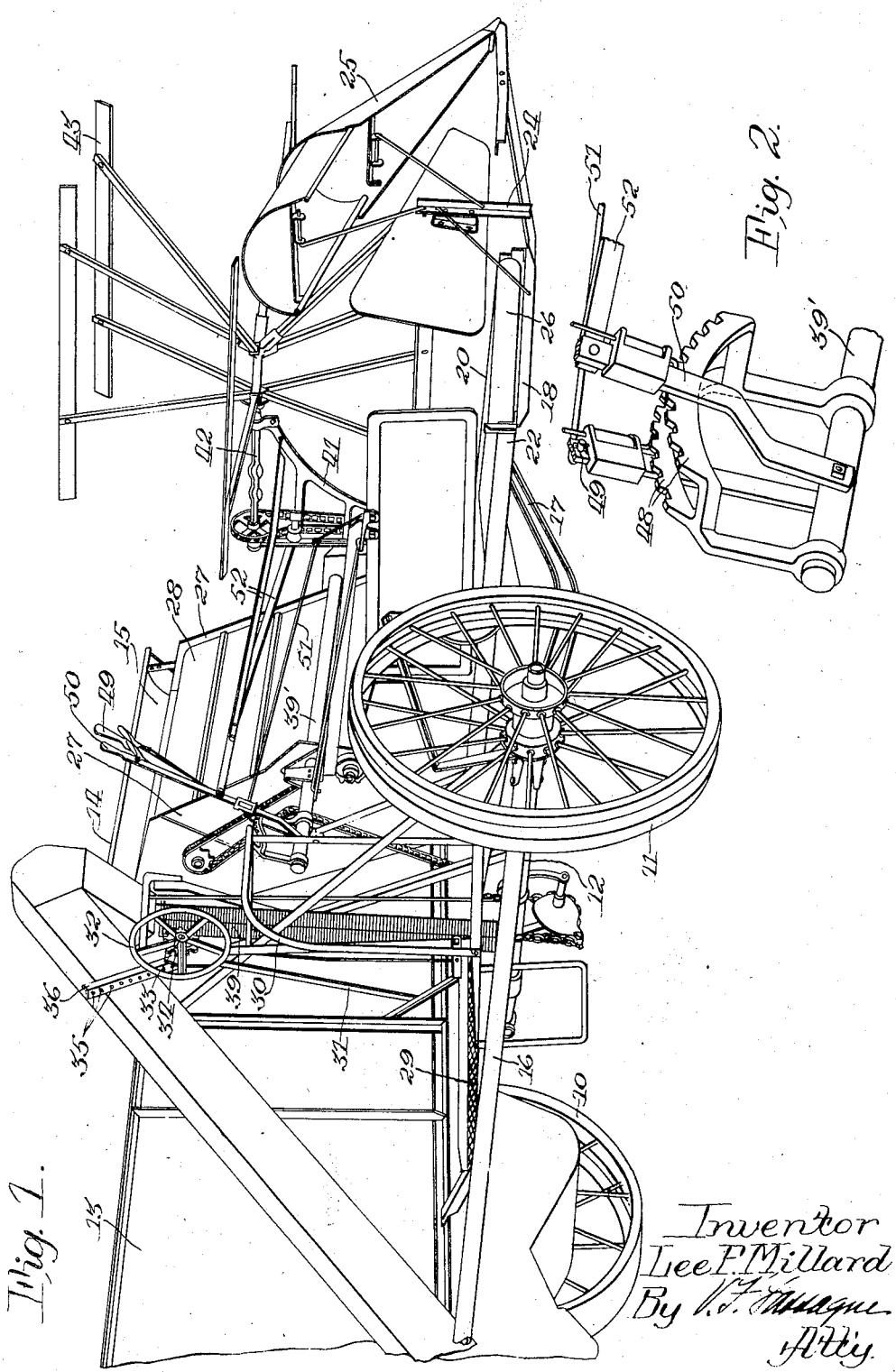

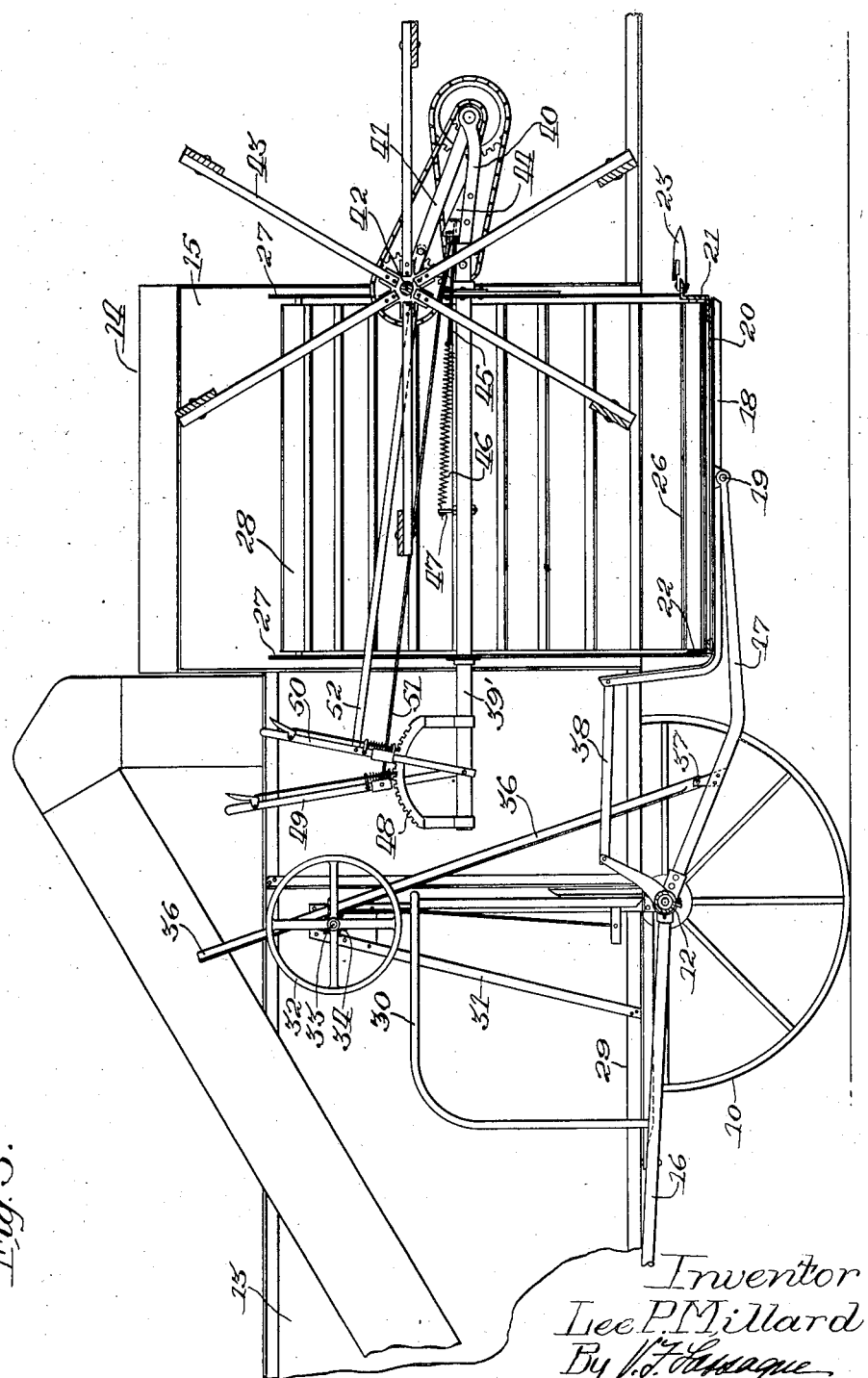

1,996,251

UNITED STATES PATENT OFFICE 1,996,251

HARVESTER THRESHER

Lee P. Millard, Moline, Ill., assignor to International Harvester Company, a corporation of New Jersey Application July 7, 1934, Serial No. 734,132

6 Claims. (Cl. 56—122)

The invention relates to harvester threshers and particularly to improvements in the mounting of the reel, and control means for raising and lowering the reel of the harvester part.

The objects of the invention are to provide an improved reel mount and control for harvester threshers to achieve a light, strong structure.

Another object is to locate such control in accessible proximity to an operator's platform at the grainward side of the thresher.

Still another object is to provide such reel control means which moves up and down with the platform when the latter is adjusted so that the controls do not change their relative location with respect to the platform as the latter is adjusted up and down.

Other objects will be apparent to those skilled in this art as the disclosure is more fully made.

Briefly, such objects are attained in a harvester thresher having a thresher part and a harvester part comprising a unitary platform and elevator, said harvester part being associated with a support extending from the thresher in a manner to enable the platform and elevator to be raised and lowered to adjust the height of cut. A longitudinal member is carried on the front and rear walls or sides of the elevator, said member serving to brace and strengthen the elevator structure. The platform carries a reel and on the forward end of said longitudinal member is means for adjustably carrying the reel. The rear end of said longitudinal member projects rearwardly of the rear side of the elevator to be in position adjacent an operator's station hung from the grainward side of the thresher. Said rear end of the longitudinal brace member carries levers and connections for raising and lowering the reel and for moving it fore and aft, said levers being accessible from said operator's station. The elevator brace and lever carrying member also carries a spring means for counterbalancing the weight of the reel while it is being moved during its adjustments.

This structure is shown in the accompanying sheets of drawings, wherein:

Figure 1 is a general perspective view of the harvester thresher, looking from the rear grainward side;

Figure 2 is an enlarged detail view, also in perspective, of the reel control lever assembly; and, Figure 3 is a general side elevational view of the grainward side of the machine with the outer end of the harvester platform cut off.

The present harvester thresher is of the two wheel type having a thresher side wheel 10 and a harvester side wheel 11 carried on a transverse axle 12. The stubbleward end of the axle in any usual way carries the longitudinal thresher part 13, at the forward end of which is the feeder housing 14, which is open, as at 15, on its grainward side. The axle 12 projects a substantial distance grainwardly of the thresher 13 and is braced in its transverse position by a bar 16 connected between the outer end of the axle and the thresher.

The axle 12 carries pivotally connected thereto a forwardly extending line lever 17, the forward end of which is pivoted to the frame structure 18, by a pin 19, of a harvester platform 20. This platform is the usual transverse harvester platform bounded at its front edge by a transverse Z-bar 21 and at its rear edge by a parallel angle bar 22. The Z-bar carries the usual reciprocatory cutting mechanism represented by the finger guards 23. The outer end of the platform carries a support 24 for carrying a torpedo type divider 25.

The platform 20 carries a transverse endless apron conveyer 26, which moves the cut grain transversely in a stubbleward direction to an upright elevator having front and rear sides 27, said elevator extending upwardly and inclined toward the feeder house 14, so that the discharge end of said elevator 27 feeds into the opening 15, there being the usual elevator apron conveyers 28 for taking the cut grain from the platform conveyer 26. This elevator 27 is rigidly mounted on the harvester platform.

Supported by appropriate braces from the grainward side of the thresher 13 is an operator's platform 29 enclosed by a guard rail 30, the front end of said operator's platform being located behind the elevator 27. Mounted on suitable standards 31 and accessible from said platform 29 is a hand wheel 32 on a shaft 33, which also carries a pin wheel 34 meshed with holes 35 in a rack bar 36, which has its lower end pivotally connected at 37 to the line lever 17. In the usual way, when the wheel 32 is hand operated, the bar 36 moves the lever 17 to raise and lower the harvester platform 20 to change the height of cut. The elevator 27 being rigidly mounted on the harvester platform moves up and down with it as a unit. A parallel ruler link 38 is provided to keep the platform 20 substantially horizontal in all its positions of adjustment. The usual counterbalance spring structure 39 is connected between the harvester and thresher to assist the adjustment of the harvester part by counterbalancing the weight thereof.

The front and rear sides 27 of the elevator, above the conveyer 28 therein, have securely fastened thereto, in cross brace fashion, a longitudinal member in the form of a round bar 39', which at its front end pivotally carries a bracket or arm 40, in turn pivotally carrying a bracket or arm 41. These arms 40, 41 constitute a bracket for carrying a transverse reel shaft 42, on which is rotatably supported the harvester reel 43, the reel being driven in any way, as for example by the chains and sprocket wheels shown. The arm 40 carries a plate 44, in which is pivotally connected a longitudinal rod 45 having connection with a spring 46 anchored at 47 to the bar 39', as shown in Figure 2.

The rear end of the brace bar 39' extends a distance rearwardly of the elevator 27, to carry a pair of toothed quadrants 48, (see also Figure 2), and a pair of hand levers 49, 50. The lever 49 has connected to it a forwardly extending rod 51, which has its front end connected to the plate 44 on the arm 40. Similarly, the lever 50 has connected to it a forked link 52, the front ends of which are connected at spaced points to the reel bracket part 41. By means of the lever 49 and rod 51, the arm 40 can be actuated to raise or lower the reel shaft 42 and reel 43; while, by means of the lever 50 and link 52, the arm 41 can be actuated to move the reel fore and aft. The levers just described have the usual detents associated with them and cooperable with the quadrants 48 to hold the levers and associated parts locked in adjusted positions. The spring 46 serves to counterbalance the weight of the reel as it is adjustably moved by said levers. It is to be noted that the rearward extension of the bar 39' serves to locate the levers 49, 50 in a position accessible to the operator on his station 29. The bar 39' further performs the important additional function of cross-bracing the sides 27 of the elevator. Thus, a lighter structure for the elevator may be utilized.

These levers 49, 50 are mounted on the elevator 27 through the medium of the bar 39' and the same is true of the reel 43. Thus, as the harvester part comprising the platform 20 and elevator 27 are adjusted up and down by the adjusting rack bar 36, the reel adjusting means moves bodily with the elevator and the relative positions of these parts consequently are never altered. Regardless of the elevation of the harvester part, the reel control levers always remain accessible to the operator on his platform 29.

From the above description, it can now be seen that an improved elevator construction and reel mounting and adjusting means have been provided for harvester threshers.

It is the intention to cover all changes and modifications not departing from the scope of the invention as hereinafter claimed.

What is claimed is:

1. In a harvester thresher, a thresher having a feeder housing, a transverse harvester platform associated with the thresher for up and down movement, an elevator having front and rear side walls mounted on the platform, said elevator discharging into the feeder housing, a longitudinal bar carried by the elevator side walls to brace the same, a reel adjustably carried by the said bar at its forward end, and lever means carried at the rear end of the bar for adjusting said reel.

2. In a harvester thresher, a longitudinal thresher having a feeder housing forwardly thereof, a transverse harvester platform associated with the thresher for up and down movement, an elevator rigidly mounted on the stubbleward end of the platform and discharging into said feeder housing, said elevator carrying a longitudinal bar thereacross, a reel carried on the forward end of said bar for up and down and fore and aft movement, said bar being extended rearwardly of the elevator, an operator's platform carried by the grainward side of the thresher, and lever mechanism on the rearwardly extended end of the bar accessible from the operator's platform for adjusting the reel.

3. A harvester thresher comprising a thresher, a harvester platform including an elevator rigidly carried by the platform, a reel carried by the elevator, means carried by the elevator for adjusting the reel, and means for adjusting the platform and elevator as a unit.

4. A harvester comprising a longitudinal thresher, a harvester platform including an elevator rigidly carried thereby, an operator's platform at the grainward side of the thresher, a support on the elevator, a reel adjustably carried on the support, means on the support to adjust the reel, and means to adjust the platform to alter the height of cut, said reel and platform adjusting means being operable from the operator's platform.

5. In a harvester thresher, a thresher having a feeder housing, a transverse harvester platform associated with the thresher for up and down adjustment, an elevator carried at the stubbleward end of the platform and feeding into the feeder housing, a longitudinal member carried across said elevator, a reel adjustably carried at the forward end of said member, means on the member including levers for adjusting said reel, and means on said member to counterbalance the weight of said reel.

6. In a harvester thresher, a thresher having a feeder housing, a transverse harvester platform associated with the thresher for up and down adjustment, an elevator carried at the stubbleward end of the platform and feeding into the feeder housing, a longitudinal member carried across said elevator, means to adjust the harvester platform up and down, and a reel and adjusting means therefor carried on said member, said elevator, member, and reel adjusting means moving bodily with the platform when it is adjusted.

LEE P. MILLARD.